United States Patent [19]

Elmgren et al.

[11] 4,095,804

[45] Jun. 20, 1978

[54] SEALING MEANS FOR HIGH TEMPERATURE, HIGH PRESSURE, CYLINDRICAL FURNACES

[75] Inventors: Staffan Elmgren, Ljungby; Lennart Svensson, Hyllinge, both of Sweden

[73] Assignee: ASEA Aktiebolag, Vasteras, Sweden

[21] Appl. No.: 825,100

[22] Filed: Aug. 16, 1977

[30] Foreign Application Priority Data

Aug. 23, 1976 Sweden ............................... 7609298

[51] Int. Cl.$^2$ .......................... F16J 15/02; H05B 1/00

[52] U.S. Cl. ........................................ 277/12; 277/22; 13/32; 165/70; 165/170; 432/238

[58] Field of Search ....................... 13/2, 32; 432/238; 165/70, 170; 277/3, 12, 15, 16, 22

[56] References Cited

U.S. PATENT DOCUMENTS

| | | | |
|---|---|---|---|
| 1,940,256 | 12/1933 | Krebs | 13/32 X |
| 3,709,506 | 1/1973 | Beerman | 277/12 |
| 4,003,697 | 1/1977 | Elmgren | 432/238 |

FOREIGN PATENT DOCUMENTS

| | | | |
|---|---|---|---|
| 1,812,560 | 6/1970 | Germany | 165/70 |

*Primary Examiner*—Robert S. Ward, Jr.
*Attorney, Agent, or Firm*—Watson, Cole, Grindle & Watson

[57] ABSTRACT

Sealing means useful in connection with cylindrical, elongated furnaces wherein materials are treated at high pressures and high temperatures. Such furnaces generally include a cylinder, end closures and a cooling plate structure carried by the end closure and disposed internally of the furnace. The sealing means comprises an attachment ring for retaining the cooling plate in position on the end closure and a number of annular seals disposed in sealing relationship with respect to the gap between the attachment ring and the cooling plate structure. A draining channel is provided to intercommunicate said gap and the atmosphere surrounding the furnace.

7 Claims, 3 Drawing Figures

SEALING MEANS FOR HIGH TEMPERATURE, HIGH PRESSURE, CYLINDRICAL FURNACES

BACKGROUND OF THE INVENTION

1. Field of the Invention

The present invention relates to sealing means particularly for use with cylindrical, elongated, preferably vertical furnaces useful for treatment of materials at high temperatures, preferably above 1000° C, in high pressure gaseous atmospheres, preferably above 500 bar.

2. Description of the Prior Art

U.S. Pat. No. 3,995,101 (the entirety of the disclosure of which is hereby specifically incorporated by reference) shows and describes in detail a pressure furnace of the kind to which the present invention may be applied. Generally, in such furnaces, it is necessary to cool the structure defining the pressure chamber that surrounds the furnace space, to prevent such structure, which generally consists of a cylinder and end closures, from being heated to such an extent that the operation of the pressure chamber structure is jeopardized. Such end closures may be provided with one or more cooling channels for passage of a coolant, usually water. The cooling channels may be arranged in a cooling plate joined at an end closure that projects into the pressure chamber cylinder.

Necessarily, completely reliable seal means must be provided between the interior of the pressure chamber and the coolant channels in the end closures. In the event of leakage from a coolant channel and into the furnace space when the latter is at atmospheric pressure, even an insignificant quantity of coolant may have an entirely ruining effect on furnace components such as heating elements or molybdenum tubes in the furnace insulation often necessitating the repair or replacement of these expensive furnace components. On the other hand, leakage of pressure medium into the coolant channels may force the coolant from the channels and cause the pressure in the coolant system to increase to such an extent that cooling is terminated. Further, the pressure in the coolant system may increase to a level which is detrimental to the physical structure of the coolant system whereby damage to material and personnel may result. In this regard it should be noted that even an insignificant volumetric quantity of a leaking gaseous pressure medium at a pressure of 1000 bar results in a large volume when the pressure decreases to the pressure of the coolant system. Thus, a small volume leaking from the furnace may completely blow all the coolant from the coolant system and cause a great increase of pressure since the pressure of the coolant system is generally only about 10 or 20 bar.

SUMMARY OF THE INVENTION

The above-mentioned leakage risks are substantially eliminated by the seal means of the present invention wherein at least one end closure is formed with a cooling plate structure that is retained by a ring joined to the end closure by a number of bolts. Seals are arranged and disposed to prevent pressure medium and/or coolant from forcing their way into the annular gap between the retaining ring and the cooling plate structure. The cooling plate structure may consist of a single plate that has cooling channels therein and which is joined to the end closure. On the other hand, the cooling plate structure may consist of two plates joined together in a manner to present the cooling channels. In the embodiment where the cooling plate structure consists of two separate plates, the latter may be fastened together by bolts passing through holes in the outer plate that is nearest the end closure and threaded into corresponding holes in the outer surface of the inner plate that is nearest the interior of the pressure chamber. It is also possible for such plates to be fastened to each other by welding or the like.

A draining channel may be provided to extend from the annular gap formed between the retaining ring and the cooling plate structure to the atmosphere surrounding the pressure chamber. This channel will provide an indication that pressure medium or coolant has leaked past the seals. Sealing rings are arranged in such a manner that a first sealing ring is disposed in sealing relationship between the attachment ring and the end closure, a second sealing ring is disposed in sealing relationship between the attachment ring and the cooling plate structure and a third sealing ring is disposed in sealing relationship between the cooling plate structure and the end closure.

In the embodiment where the cooling plate structure is composed of two separate plates, the second sealing ring is preferably disposed in sealing relationship between the attachment ring and the inner plate of the cooling plate structure, the latter being the plate immediately facing the interior of the pressure chamber. In this embodiment where the cooling plate structure consists of two plates, a sleeve and appropriate sealing rings may be inserted in a position in the supply channel for coolant to prevent leakage of the latter into the gap between the end closure and the outer plate of the cooling plate structure. Such sleeve should be configured and disposed to bridge said gap. The sleeve and such seals will prevent pressurized coolant from forcing its way out of the coolant channel and into the gap between the cooling plate structure and the end closure.

An advantage of the invention is that even the most sensitive seals can be replaced without the necessity of touching or lifting the generally heavy cooling plate structure. The seals are accessable simply by loosening and lifting the retaining ring. Thus, bushings passing through the cooling plate structure need not be detached. Moreover, when the present invention is used there is no need for mounting bolts to extend completely through the cooling plate structure with the resultant increased risk of leakage. If leakage does occur, it is indicated in a simple manner through the use of the draining channel. A cooling plate structure consisting of two plates may also be used without any increased risk of leakage between the interior of the furnace and the cooling system.

When the diameter of the pressure chamber is large, the use of a divided cooling plate structure has been found to be particularly advantageous. This is true because the divided cooling plate structure tends to minimize the lifting force caused by the coolant pressure as well as the forces acting on the attachment ring. The attachment ring may thus have smaller dimensions relative to the cooling plate structure whereby a larger area of the latter is available for more efficient cooling.

DETAILED DESCRIPTION OF THE PREFERRED EMBODIMENTS OF THE INVENTION

Figure 1:
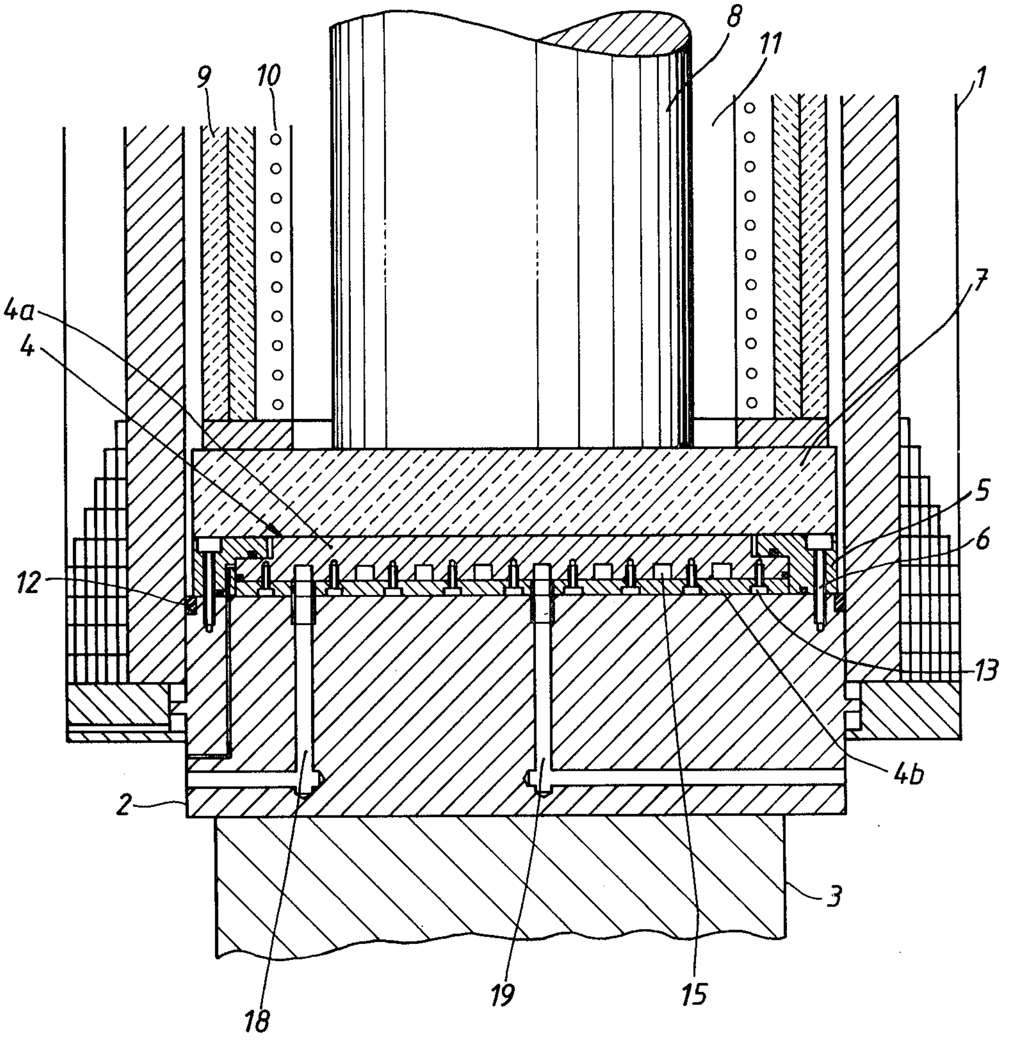
FIG. 1 is a cross-sectional view illustrating the lower part of a pressure furnace which includes a first embodiment of the present invention.
Figure 2:
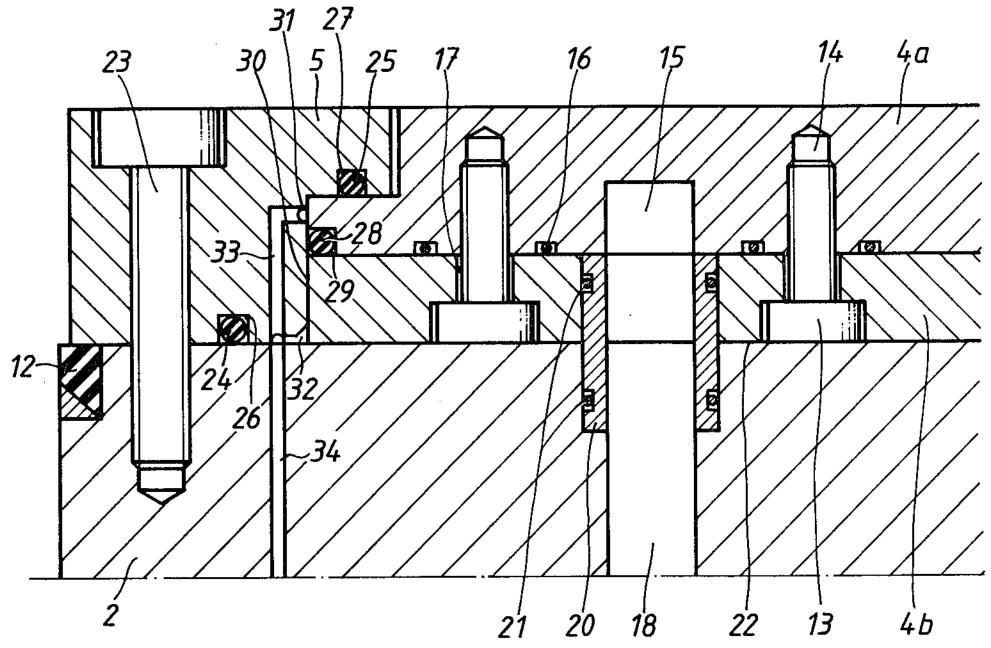
FIG. 2 is an enlarged view of a portion of FIG. 1.
Figure 3:
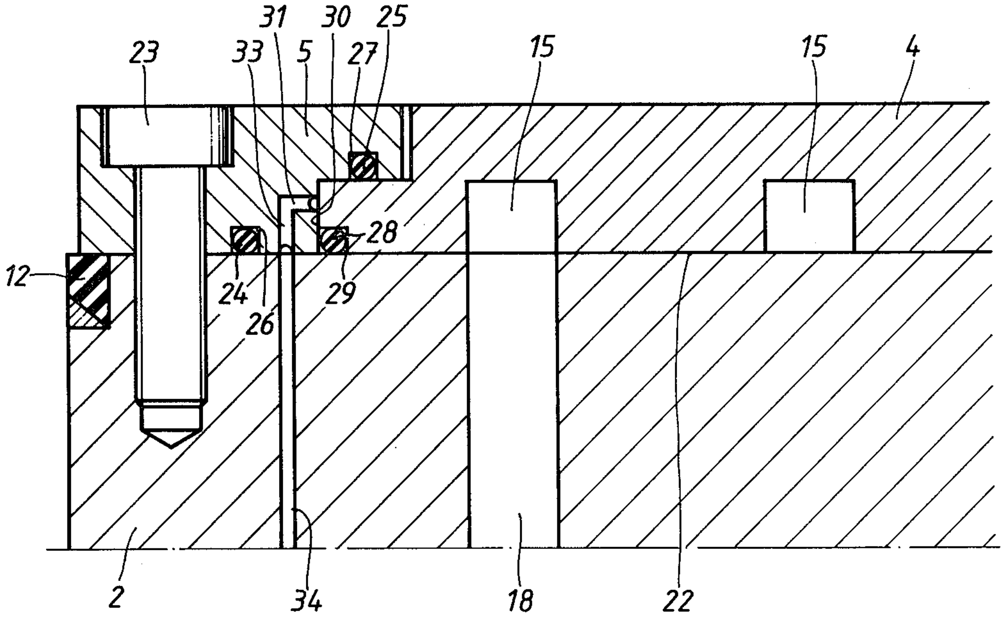
FIG. 3 is a view similar to FIG. 2 but illustrating a second embodiment of the invention.

In FIGS. 1, 2 and 3, the reference numeral 1 designates a pressure chamber cylinder that is closed by an end closure 2 held in position by yoke 3 in a press stand. The remainder of the press stand is not shown; however, it will be understood by those skilled in the art that such press stand counters the axial forces acting on closure 2. Cooling plate structure 4 rests on closure 2 and is retained by an attachment or holder ring 5 fastened to closure 2 by a number of bolts 23. An insulating bottom 7 rests on cooling plate structure 4 and supports a workpiece 8 undergoing treatment. An insulating casing 9 and a heater 10 surround furnace interior 11 and are also supported by bottom 7. A seal 12 is disposed between closure 2 and cylinder 1 as can best be seen in FIG. 1.

In the embodiment of FIGS. 1 and 2, cooling plate structure 4 is divided and comprises an upper plate portion **4*a* and a lower plate portion 4*b*. Portions 4*a* and 4*b* are fastened together by a number of bolts 13 which extend through bolt holes 17 in plate portion 4*b* and are threadably engaged into bottom holes 14 in plate portion 4*a*. A slot in plate portion 4*a* cooperates with the adjacent surface of plate portion 4*b* to present a closed channel 15 for coolant flow. Bolts 13 act against the forces which occur when coolant pressure tends to separate plates 4*a* and 4*b*. Seals 16 disposed between plate portions 4*a* and 4*b* prevent coolant from escaping through bolt holes 17 in plate 4*b*. Channels 18 and 19 in end closure 2 communicate with channel 15 for supplying and exhausting coolant. A sleeve 20 bridges gap 22 between end closure 2 and plate portion 4*b* and together with seals 21 prevents coolant from entering gap 22 to create a force which would tend to lift cooling plate structure 4**.

In the embodiment of FIGS. 1 and 2, attachment ring 5 needs only to fix the radial position of cooling plate structure 4 and together with the latter presents slots, such as slots 27 and 29, for seals, such as seals 25 and 28. Ring 5 may therefore have relatively small dimensions and may be secured to closure 2 by a limited number of relatively weak bolts 23. Seals 24 and 25 in slots 26 and 27 respectively in ring 5 prevent the escape of pressure medium from furnace interior 11 between ring 5 and end closure 2 and plate portion **4*a*, respectively. Seal 28 in slot 29, formed between plates 4*a* and 4*b*, prevents coolant from escaping between cooling plate portions 4*a* and 4*b***.

In the event of leakage, gap 30 between cooling plate structure 4 and ring 5 is drained through channels 31, 32, 33 and 34. Thus, any pressure medium and coolant which leak will be diverted immediately through channel 34 to prevent leaking coolant from penetrating into furnace interior 11 and to prevent leaking pressure medium from penetrating into coolant channel 15. Moreover, the leaking coolant or pressure medium will flow from channel 34 thereby immediately providing an indication of the leak.

In the embodiment of FIG. 3, cooling plate structure 4 consists of a single plate and cooling channel 15 is formed between the slot in the plate and the upper surface of end closure 2. Thus, coolant in cooling channel 15 has access to gap 22 and the coolant pressure therein tends to separate plate structure 4 and closure 2.

Ring 5 and bolts 23 must therefore be sufficiently strong to resist the lifting force imposed by the coolant.

For an upper end closure similar to that which has been described for the lower end but wherein the closure is disposed over the pressure chamber space, the attachment ring must carry the weight of the cooling plate structure. Thus, for larger diameter furnaces, the simpler construction of FIG. 3 is less suitable.

While seals 24 and 25 have been illustrated as being located in slots 26 and 27 in attachment ring 5, it should be understood that such slots might alternatively be arranged in end closure 2 and/or in cooling plate structure 4. If would be well within the skill of the routineer in this art to make such substitution if desired.

We claim:

1. Sealing means for use with a cylindrical, elongated, high temperature, high pressure, material treatment furnace comprising vertical, hollow cylindrical means defining a high pressure gaseous medium containment chamber, an end closure projecting into said hollow cylindrical means and a cooling plate structure including means defining a coolant passage mounted on the end closure for preventing harmful heating of the latter, said sealing means comprising:

an attachment ring disposed in surrounding relationship to said cooling plate structure for retaining the latter against said closure and fastened to the end closure by bolt means, there being an annular gap defined between said plate structure and said ring; and sealing means positioned to prevent pressure medium from said chamber and coolant from said passages from forcing their way into said gap.

2. The invention of claim 1 wherein said cooling plate structure comprises an outer plate disposed adjacent said end closure and an inner plate disposed nearer the interior of the furnace, said plates including means defining said cooling channel therebetween.

3. The invention of claim 2 wherein said plates have bolt holes and are joined by bolt means comprising bolts extending through the holes in said outer plate and into threaded engagement with the holes in the inner plate.

4. The invention of claim 1 wherein said sealing means includes means defining a draining channel communicating between said gap and the space outside the end closure for indication and removal of any pressure medium and coolant which might leak past said seals.

5. The invention of claim 1 wherein said sealing means comprises a first sealing ring disposed in sealing relationship between said attachment ring and said end closure, a second sealing ring disposed in sealing relationship between the attachment ring and the cooling plate structure and a third sealing ring disposed in sealing relationship between the cooling plate structure and said end closure.

6. The invention of claim 2 wherein said sealing means comprises a first sealing ring disposed in sealing relationship between said attachment ring and said end closure, a second sealing ring disposed in sealing relationship between said attachment ring and said inner plate and a third sealing ring disposed in sealing relationship between said inner plate and said outer plate.

7. The invention of claim 2 wherein is provided means defining a supply channel extending through said end closure and communicating with said coolant passage and sleeve means including seals in said supply channel bridging between the end closure and the outer plate.

* * * * *